Nov. 10, 1953 R. G. OLSON Re. 23,735

GRID MOUNTING FOR COLOR TELEVISION PICTURE TUBES

Original Filed Dec. 4, 1951

RAYMOND G. OLSON
INVENTOR
BY: Kenneth T. Snow
ATT'Y

Reissued Nov. 10, 1953

Re. 23,735

UNITED STATES PATENT OFFICE 23,735

GRID MOUNTING FOR COLOR TELEVISION PICTURE TUBES

Raymond G. Olson, Niles, Ill., assignor of one-half to Kenneth T. Snow, Oak Park, Ill.

Original No. 2,635,205, dated April 14, 1953, Serial No. 259,771, December 4, 1951. Application for reissue July 6, 1953, Serial No. 366,402

5 Claims. (Cl. 313—85)

Matter enclosed in heavy brackets [ ] appears in the original patent but forms no part of this reissue specification; matter printed in italics indicates the additions made by reissue.

This invention relates to a new and improved grid mounting for color television picture tubes.

An important object of this invention is to provide mounting means for spaced grids in a television picture tube and particularly a color receiving tube.

Another important object of this invention is the provision of means in a color television picture tube of a mounting means for spaced optical and color grids and including means for uniformly tensioning the optical and color grids.

Another and further important object of this invention is to supply a mounting channel for carrying spaced optical and color grid members for employment in a color television picture tube and wherein the mounting channel is made in a manner to effect an outward extension of the grids around their full peripheries upon compression thereof of the channel.

Still another important object of this invention is to provide a color television tube fabrication wherein the mounting means for optical and color grids may be inserted adjacent the face of the tube after proper spacing and tensioning of the grids have been accomplished outside of the tube.

Other and further important objects of this invention will become apparent from the disclosures in the following specification and accompanying drawings.

Figure 1:
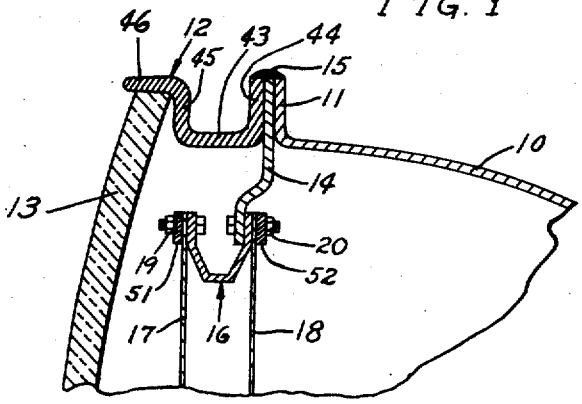
Fig. 1 is a fragmentary sectional view of a portion of a color television picture tube.

The reference numeral 10 indicates generally a cone-shaped metal envelope or shell having an outwardly extending annular flange around the forward outwardly flared end thereof. The envelope or shell 10 is similar to the metal shell as shown in my two prior pending applications for patents, Ser. No. 149,278 and Ser. No. 247,314.

The forward opening of the metal shell defined by the outwardly extending flange 11 may be round or rectangular or any shape as desired. A metal rim or bead 12 is adapted to receive a face viewing glass 13. Intermediate the bead 12 and the shell 10 is positioned a mounting frame 14. The metal face bead 12 consists of an annular longitudinally extending portion 43, the rearward end of which has an outwardly extending flange 44 comparable in height to the shell flange 11. Further the bead 12 has a forwardly spaced flange 45 disposed parallel to the flange 44. The outward end of the flange 45 is bent forwardly as shown at 46. It is this angle portion of the bead 12 defined by the flange 45 and the forwardly bent portion 46 which receives the face glass 13. The mounting frame 14 is sandwiched between the outwardly extending flanges 11 and 44 and a single annular weld 15 is adapted for joining the shell, the mounting frame 14, and the metal rim or face bead 12 into an integral unit.

Color television and particularly that form of television wherein the three basic colors are included within a single viewing tube presents a vastly different problem from the problems of black and white television. The receiving phosphors which in the back and white picture tube were placed on the inner surface of the viewing face glass cannot now be positioned on the glass to accomplish a desirable color picture. It is therefore necessary to place the receiving phosphors on a grid which will be optically correct in receiving the three-color picture from the electron beams whether they be in a single gun or three guns. It has further been found that each of the three basic colors must have separate receiving phosphors in order to present a true color picture. Thus we must have a color grid containing the receiving phosphors for each of the basic colors red, green and blue and we must also be able to energize the individual basic colors separately one from the other so there is no spill over from one color to the other. There have been several methods and systems worked out for accomplishing the receiving of color pictures within a single tube. One of these is known as a dot sequential system wherein a plurality of dispersed color receiving phosphors are placed closely together over the entire surface of a color grid in a regular and repeating triangular pattern and by means of an optical grid spaced from the color grid the electron guns are capable of energizing all of the individual color phosphors in successive order so that the viewer of the resultant picture will effectively see a full color picture and not a plurality of separate individually colored pictures. The optical grid consists of a sheet of thin material having a plurality of holes or openings therein which are aligned in a predetermined manner and having an exact spacing from the color grid so that the separate color receiving phosphors may be separately and successively energized for receiving a good color picture. Another type of color transmission and receiving is a line sequential system wherein in lieu of the plurality of dots there is a plurality of line receiving phosphors for each of the three basic colors. The lines may be disposed either horizontally or vertically over the face of either a round or rectangularly shaped tube. Similarly the optical grid in lieu of having circular holes will have elongated slits or slots to effect an energizing of the line phosphors.

A V-shaped channel 16 is adapted to carry a preferably transparent or translucent color grid 17 and a rearwardly spaced apart apertured optical grid 18 of extremely thin material. Any suitable fastening means may be employed in the attaching of the color grid 17 to the V-shaped channel member 16. In the present instance the fastening means has been shown as bolts 19. An annular washer 51 is employed over the rim of the color grid and beneath the bolts 19 in order to hold the grid uniformly over its full annular surface. Similarly the fastening means for the optical grid to the channel 16 may take any form. Bolts 20 join the optical grid 18 to the channel 16 and also constitute the means for joining the channel to the mounting frame 14. Here again a metal rim 52 extends around the periphery of the optical grid to hold it uniformly taut. The weld 15 thus holds the grids integral with the envelope 10 and face receiving bead 12.

Figure 2:
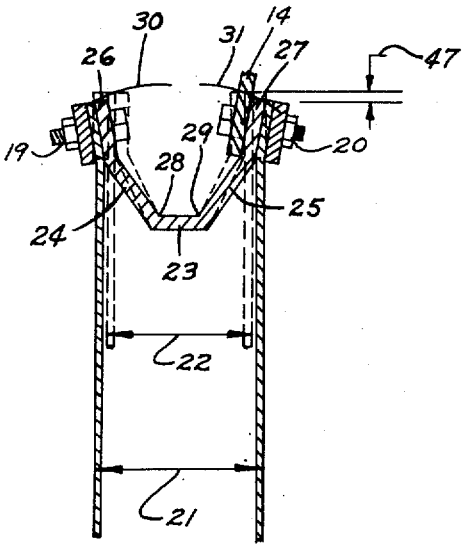
Fig. 2 is an enlarged sectional view showing the mounting channel member for the optical and color grids of a color television picture tube as shown in the device of Fig. 1, and prior to tensioning of the grids.

The V-shaped channel 16 is best shown in the enlarged view of Fig. 2. The channel 16 is shown in spread condition at which time the spaced grids are attached thereto. Subsequently to the attaching of the grids to the V-shaped channel 16 the entire unit is pressed together so that the final spacing of the optical grid with respect to the color grid is a predetermined distance and optically correct for the receiving of color from the basic color electron guns employed in this color television picture tube. As stated above it is the primary object of this invention to provide a spacing means for the optical and color grids and simultaneously provide a spacing means which will place the two grid members under equal and uniform tension so that the optical grid opening whatever shape it may be will be in optical alignment with the basic color receiving phosphors on the spaced apart color grid. As shown in Fig. 2 the reference numeral 21 indicates the spacing of the color and optical grids prior to the tensioning of the grids. The fabrication of the color television picture tube grid assembly is preferably completed outside of the tube prior to assembly with the shell and face receiving bead 12. It is thus relatively easy to compress the entire unit of optical and color grids and their intermediate channel 16 so that the grids have the desired and necessary spacing and tautness. This resultant and desired spacing of the grids is indicated at 22 in Fig. 2.

In order that there be a clear understanding of the functioning of the V-shaped channel it is necessary to note that the channel comprises a base member 23, an outwardly angled side member 24, and an oppositely extending outwardly angled side member 25. Each of the outwardly angling sides has an upper straight end portion 26 and 27 respectively for the flush receiving of color and optical grids. Pivot points 28 and 29 are provided in the channel 16. These points or annular lines define the places at which the metal in the channel has been weakened and are located at the juncture between the base 23 and the outwardly angled side walls 24 and 25. These pivotal positions are provided for the bending of the identical length outwardly angled sides thereabout. The reference numeral 30 indicates an arc defined by the pivotal movement of the side 24—26 about the center 28 of the V-shaped channel 16. Similarly the numeral 31 indicates the arc defined by pivotal movement of the side 25—27 about the pivot center 29. The final spacing of the optical and color grids is shown in dashed lines in Fig. 2. The compressed position of the V-shaped channel 16 is similarly shown in dashed lines in the same figure. The reference numeral 47 indicates the outward extension around the full annular periphery of the grid supporting V-shaped channel after the compression of the grids and channel to the ultimate spaced position 22. It is thus apparent that when the grids are properly spaced apart they are also under proper and desired tension. The unit as now assembled is joined by welding to the shell and face bead as shown in Fig. 1 to complete the fabrication of the color television picture tube just prior to the fusing of the face glass within the angle 45—46 of the bead 12. It is again repeated that the picture tube of this invention may be either round or rectangular as desired.

In the operation of the device of this invention the V-shaped channel member 16 is initially widespread at which time the optical grid and the color grid having the color receiving phosphors thereon are bolted to the V-shaped channel member by bolt fastening means 19 and 20. At this time the two grids and their intermediate spacer member in the form of the annular V-shaped channel 16 are compressed together to the point where just the proper spacing exists between the optical and color grids. As previously stated this causes an outward extension of the full annular peripheries of the spaced grids. Each of the grids namely the color and optical grids become uniformly taut and uniformly extended over their full surfaces so that the optical grid is in optical alignment with the color phosphors on the color grid member. The sub-assembly of the optical and color grids with the V-shaped channel member 16 includes the mounting frame 14 so that after the grid members are stretched the proper amount the assembly of the color television envelope may be completed. This is accomplished by placing the mounting frame onto the forward flange 11 of the envelope or shell 10 whereafter the bead member 12 with its rearwardly disposed outwardly extending flange 44 abuts the mounting frame so that the three elements, namely the shell, mounting frame, and bead may be welded by means of the single weld as shown at 15 for assembling the units in an integral fashion. Subsequent to the positioning of the grids within the shell the face glass is fused into position on the face receiving bead 12.

Figure 3:
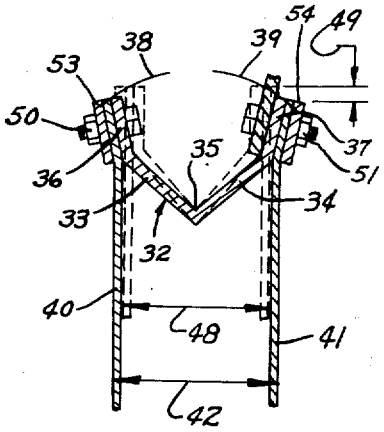
Fig. 3 is a view similar to Fig.2 showing a modified shape of mounting channel.

As shown in Fig. 3 there is disclosed a modified shape of V-channel in which there is eliminated the base or flat portion. The V-shaped channel 32 is an annular member to which the optical and color grids are attached in the same manner as to the channel 16 in Fig. 1. This channel as shown in Fig. 3 is provided with an outwardly angled side portion 33 and an opposite outwardly angled side portion 34. These angled side members are joined at a single center 35 which as stated for the pivot centers of the channel 16 comprise a metal weakened line about which the angled sides are forced to pivot. The outwardly angled side walls 33 and 34 may be arcuately bent about the center 35 to accomplish the stretching of the attached optical and color grids. The channel 32 is further provided with an upper straight side 36 forming a continuation of the outwardly angling side 33 and similarly the opposite angled side 34 is provided with an upper straight portion 37. The numeral 38 defines an arc which will be occasioned by the rotation of the side 33—36 about the center 35. The arc 39 is similarly defined by rotation of the side 34—37 about the same center 35. In all instances the opposing outwardly angling side portions of a V-shaped channel member and their integral straight upper side portions must be of equal length so that upon a compression of the V-shaped member the grids attached on each side of the channel are stretched an equal amount.

For purposes of illustration the V-shaped channel 32 is provided with a color grid 40 on one side thereof and an optical grid 41 on the other side. In the same manner as the device of Figure 1 the color and optical grids are fixedly attached to the channel at points around the periphery thereof as by bolts or other fastening means 50 and 51 respectively. Annular rims 53 and 54 comparable to the rims 51 and 52 extend around the full peripheries of the color and optical grids 40 and 41 to securely hold the grids when they are made taut.

In the operation of the device of Figure 3 the optical grid and color grid are fastened to the flat portions 36 and 37 of the angled side walls 33 and 34. At this point in the fabrication the V-shaped channel 32 is relatively wide spread. The spacing dimension prior to compression is shown at 42. Similarly after the device has been compressed the spacing of the grids is indicated by the numeral 48. This is the final or ultimate spacing of the grids. The outward extension of both of the channel sides is indicated at 49 wherein the dimension shows the amount of outward extension of the grids and their intermediate V-shaped channel member that occurred during compression of the grids. It is apparent therefore that the device of this invention performs the dual function of properly spacing the optical and color grids and during assembly of these two elements simultaneously acts to stretch the grids so that they remain taut for effectively receiving color pictures.

Numerous details of construction may be varied throughout a wide range without departing from the principles disclosed herein and I therefore do not propose limiting the patent granted hereon otherwise than as necessitated by the appended claims.

What is claimed is:

1. In a color television picture tube comprising a grid having color receiving phosphors, an optical grid, means mounting said color grid and said optical grid in spaced apart relationship, means for stretching said grids, said means for stretching the grids including an outwardly opening V-shaped channel member positioned between and extending around the peripheries of said grids.

2. In a color television envelope of the type having a shell, a rim fastened to the forward end of said shell, a picture viewing glass sealed to said rim and including a color receiving grid, an optical grid, spacer means for carrying said color and optical grids, means attaching said spaced grids to said envelope, and said spacer means including an annular V-shaped outwardly opening channel whereby a compressing thereof stretches the grids outwardly around their full peripheries.

3. A device as set forth in claim 2 in which the annular V-shaped outwardly opening channel comprises, in cross section, a base, outwardly angled side walls, grid attaching surfaces at the outer ends of the outwardly angled side walls, and the juncture of the side walls with the base defining bend lines for arcuate swinging of the side walls thereabout.

4. A device as set forth in claim 2 in which the annular V-shaped outwardly opening channel comprises, in cross section, outwardly angled side walls joined at one end and defining a bend line therebetween about which both side walls may be arcuately pivoted, and means at the outer ends of the angled side walls for attachably receiving said color and optical grids.

5. In a television tube envelope fabrication comprising a cone shaped [metal] shell having an outwardly extending annular *metal* flange at its flared end, a metal face bead having an outwardly extending annular flange at its rearward end, said outwardly extending annular flanges of the shell and bead being substantially identical in size and adapted for side-by-side engagement with each other, a metal grid mounting frame having an annular ring disposed between the side-by-side flanges of the shell and bead, and weld means around the annular peripheries of the shell flange, the mounting frame rim, and the bead flange.

RAYMOND G. OLSON.

References Cited in the file of this patent or the original patent

UNITED STATES PATENTS

| Number | Name | Date |
|---|---|---|
| 2,254,090 | Power | Aug. 26, 1941 |
| 2,423,066 | Gibson | June 24, 1947 |
| 2,562,163 | Heinsch et al. | July 31, 1951 |
| 2,590,764 | Forgue | Mar. 25, 1952 |
| 2,602,145 | Law | July 1, 1952 |